United States Patent [19]

Nakamura et al.

[11] Patent Number: 5,787,139
[45] Date of Patent: Jul. 28, 1998

[54] FUEL LOADING METHOD

[75] Inventors: Mitsunari Nakamura, Hitachi; Katsumasa Haikawa, Jyuou; Akihiro Yamanaka, Hitachi; Akiko Kanda, Hitachi; Takaaki Mochida, Hitachi; Junichi Yamashita, Hitachi; Shigetada Tanabe, Hitachi; Shinichi Kirihara, Mito, all of Japan

[73] Assignees: Hitachi, Ltd.; Hitachi Engineering Co., Ltd., both of Japan

[21] Appl. No.: 858,687

[22] Filed: May 19, 1997

[30] Foreign Application Priority Data

May 20, 1996 [JP] Japan ................................. 8-124349

[51] Int. Cl.$^6$ .......................... G21C 19/20; G21C 5/12
[52] U.S. Cl. .................................................. 376/267
[58] Field of Search ................................. 376/267, 349

[56] References Cited

U.S. PATENT DOCUMENTS 5,271,050 12/1993 Nagano et al. .................... 376/267
5,307,387 4/1994 Nakajima et al. .................. 376/267

FOREIGN PATENT DOCUMENTS 61-165682  7/1986  Japan.
3-214097   9/1991  Japan.
5-249270   9/1993  Japan.
7-244184   9/1995  Japan.

*Primary Examiner*—Daniel D. Wasil
*Attorney, Agent, or Firm*—Fay, Sharpe, Beall, Fagan, Minnich & McKee

[57] ABSTRACT

In a fuel loading method of the present invention, a nuclear reactor is operated up to the second cycle without exchanging the fuel. Low-enrichment fuel is discharged from a core at the end of the second cycle and at the end of the third cycle. Moreover, high-enrichment fuel with an average enrichment higher than that of replacement fuel is discharged from the core at the end of the third cycle and reloaded into the core at the end of the fifth cycle.

According to the present invention, because the high-enrichment fuel discharged from the core at the end of the third cycle normally has a high enrichment, a short combustion period, and a low burnup compared to the replacement fuel burned for 4 to 5 cycles, a lot of fissionable material are left in the high-enrichment fuel. By reloading the high-enrichment fuel to the core after one cycle or more passes, it is possible to greatly increase the discharge exposure of initially loaded fuel. Thereby, it is possible to greatly decrease the number of pieces of the replacement fuel.

9 Claims, 7 Drawing Sheets

CONTROL CELL : 29

LOW-ENRICHMENT FUEL ASSEMBLY : 208

HIGH-ENRICHMENT FUEL ASSEMBLY : 664

FIG.3

CONTROL CELL : 37

LOW-ENRICHMENT FUEL ASSEMBLY : 208

HIGH-ENRICHMENT FUEL ASSEMBLY : 664

FIG.4

CONTROL CELL : 37

LOW-ENRICHMENT FUEL ASSEMBLY : 76

HIGH-ENRICHMENT FUEL ASSEMBLY : 664

FIRST-TIME REPLACEMENT FUEL ASSEMBLY : 132

FIG.5

CONTROL CELL : 13

| 6 | HIGH-ENRICHMENT FUEL ASSEMBLY : 520

| 2 | SECOND-TIME REPLACEMENT FUEL ASSEMBLY : 220

| 1 | FIRST-TIME REPLACEMENT FUEL ASSEMBLY : 132

FIG.6

CONTROL CELL : 13

| 6 | HIGH-ENRICHMENT FUEL ASSEMBLY : 328

| 3 | THIRD-TIME REPLACEMENT FUEL ASSEMBLY : 192

| 2 | SECOND-TIME REPLACEMENT FUEL ASSEMBLY : 220

| 1 | FIRST-TIME REPLACEMENT FUEL ASSEMBLY : 132

FIG.7

CONTROL CELL : 13

| 6 | HIGH-ENRICHMENT FUEL ASSEMBLY (RELOADED FUEL ASSEMBLY) : 144 |

| 4 | FOURTH-TIME REPLACEMENT FUEL ASSEMBLY : 184 |

| 3 | THIRD-TIME REPLACEMENT FUEL ASSEMBLY : 192 |

| 2 | SECOND-TIME REPLACEMENT FUEL ASSEMBLY : 220 |

| 1 | FIRST-TIME REPLACEMENT FUEL ASSEMBLY : 132 |

FUEL LOADING METHOD

BACKGROUND OF THE INVENTION

A fuel assembly to be initially loaded in a core after a boiling-water reactor is constructed is called initially loaded fuel assembly (hereafter referred to as initially loaded fuel) and a core comprising the initially loaded fuel is called as initial loading core.

In general, in the case of the initial loading core, a part of the initially loaded fuel is discharged from the core after the first operation cycle (hereafter referred to as cycle) is completed and replaced with new replacement fuel assemblies (hereafter referred to as replacement fuel). The fuel assemblies discharged after the first cycle have low exposure and a little generation energy compared to the other fuel assemblies.

As a conventional initial loading core, Japanese Patent Laid-Open No. 249270/1993 discloses a core comprising high-enrichment fuel assemblies with an average enrichment of 3.4 wt % (hereafter referred to as high-enrichment fuel), intermediate-enrichment fuel assemblies with an average enrichment of 2.3 wt % (hereafter referred to as intermediate-enrichment fuel), and low-enrichment fuel assemblies with an average enrichment of 1.1 wt % (hereafter referred to as low-enrichment fuel). Japanese Patent Laid-Open No. 249270/1993 also discloses that fuel assemblies with a lower average enrichment are earlier discharged from the core and fuel assemblies with a higher average enrichment is left loaded in the core for a longer time in order to effectively use fissonable material.

Moreover, as a prior art for improving the fuel economical efficiency of an initial loading core, Japanese Patent Laid-Open No. 165682/1986 discloses a technique for compensating the increment of the burnup due to the startup test of the first cycle by making the number of high-enrichment fuel assemblies with the maximum average enrichment among the fuel assemblies constituting an initial loading core larger than the number of the replacement fuel assemblies of an equilibrium core. In the case of this prior art, the average enrichment of the initially loaded high-enrichment fuel is the same as that of the replacement fuel.

Moreover, Japanese Patent Laid-Open No. 244184/1995 discloses a technique for improving the fuel economical efficiency of an initial loading core by making the average enrichment of the initially loaded high-enrichment fuel higher than that of the replacement fuel. However, because a part of the initially loaded high-enrichment fuel assemblies are discharged from the core while leaving a lot of fissible material at the end of the third cycle, the effect of increasing the discharge exposure of the initially loaded fuel is not enough.

Furthermore, Japanese Patent Laid-Open No. 214097/1991 discloses a technique for loading the initially loaded fuel discharged from the core after the end of at least the second cycle into the core again (reloading) at the time of replacement of fuel after the end of the third cycle in order to increase the discharge exposure of the initially loaded fuel and decrease the number of the replacement fuel assemblies.

In the case of the technique disclosed in Japanese Patent Laid-Open No. 214097/1991, however, because the average enrichment of the initially loaded fuel is equal to or lower than that of the replacement fuel, it is impossible to greatly raise the discharge exposure of reloaded initially loaded fuel. Therefore, the effect of increasing the discharge exposure of the initially loaded fuel and decreasing the number of the replacement fuel assemblies is inadequate.

SUMMARY OF THE INVENTION

It is an object of the present invention to provide a fuel loading method capable of greatly increasing the discharge exposure of the initially loaded fuel and greatly decreasing the number of the replacement fuel assemblies.

To achieve the above object, the present invention provides a fuel loading method of loading at least two types of fuel assemblies filled with nuclear fuel and having different average enrichments, in which fuel assemblies with an average enrichment higher than that of the replacement fuel assemblies among the fuel assemblies loaded in a core at the time of initial loading are burned in the core for three cycles and then discharged from the core and thereafter, reloaded into the core after one cycle or more pass.

It is preferable that fuel assemblies discharged from the core are reloaded into the core again after two operation cycles pass.

According to the present invention, because a high-enrichment fuel discharged from the core after the end of the third cycle normally has a high enrichment, a short combustion period, and a low burnup compared to the replacement fuel burned for 4 to 5 cycles, a lot of fissible material is left in the high-enrichment fuel. Therefore, by reloading the high-enrichment fuel into the core again after one cycle or more pass, it is possible to greatly increase the discharge exposure of the initially loaded fuel and moreover, greatly decrease the number of replacement fuel assemblies.

Furthermore, because the burnup increases as the number of cycles increases, the burnup difference between the high-enrichment fuel reloaded and the high-enrichment fuel discharged in place of the fuel reloaded increases at the end of the fifth cycle compared to the case in which the fourth cycle is completed. Therefore, by reloading the high-enrichment fuel at the end of the fifth cycle, the effect of decreasing the number of replacement fuel assemblies is further improved.

DETAILED DESCRIPTION OF THE PREFERRED EMBODIMENTS

The preferred embodiments of the present invention will be described below referring to the accompanying drawing.

Figure 1:
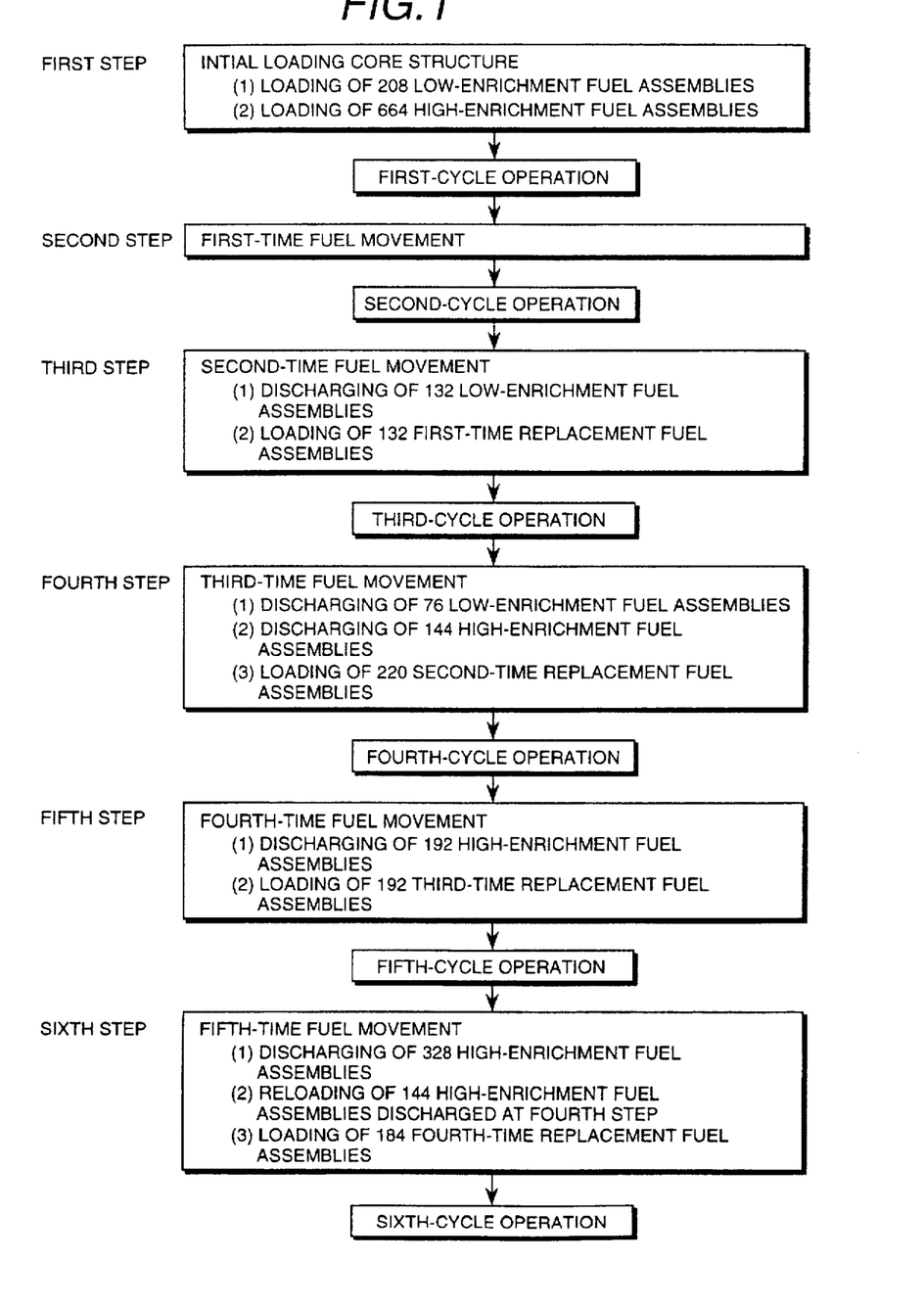
FIG. 1 is an illustration showing a method of the present invention for loading fuel into a nuclear reactor core.

FIG. 1 shows a method of the present invention for loading fuel into a nuclear reactor core. In the case of this method, a nuclear reactor is operated up to the second cycle without replacing fuel. The low-enrichment fuel is discharged from the core at the end of the second cycle and at the end of the third cycle. Moreover, the high-enrichment fuel with an average enrichment higher than that of the replacement fuel is discharged from the core at the end of the third cycle and reloaded in the core at the end of the fifth cycle. The fuel loading method of FIG. 1 will be described below starting with the first step.

Figure 2:
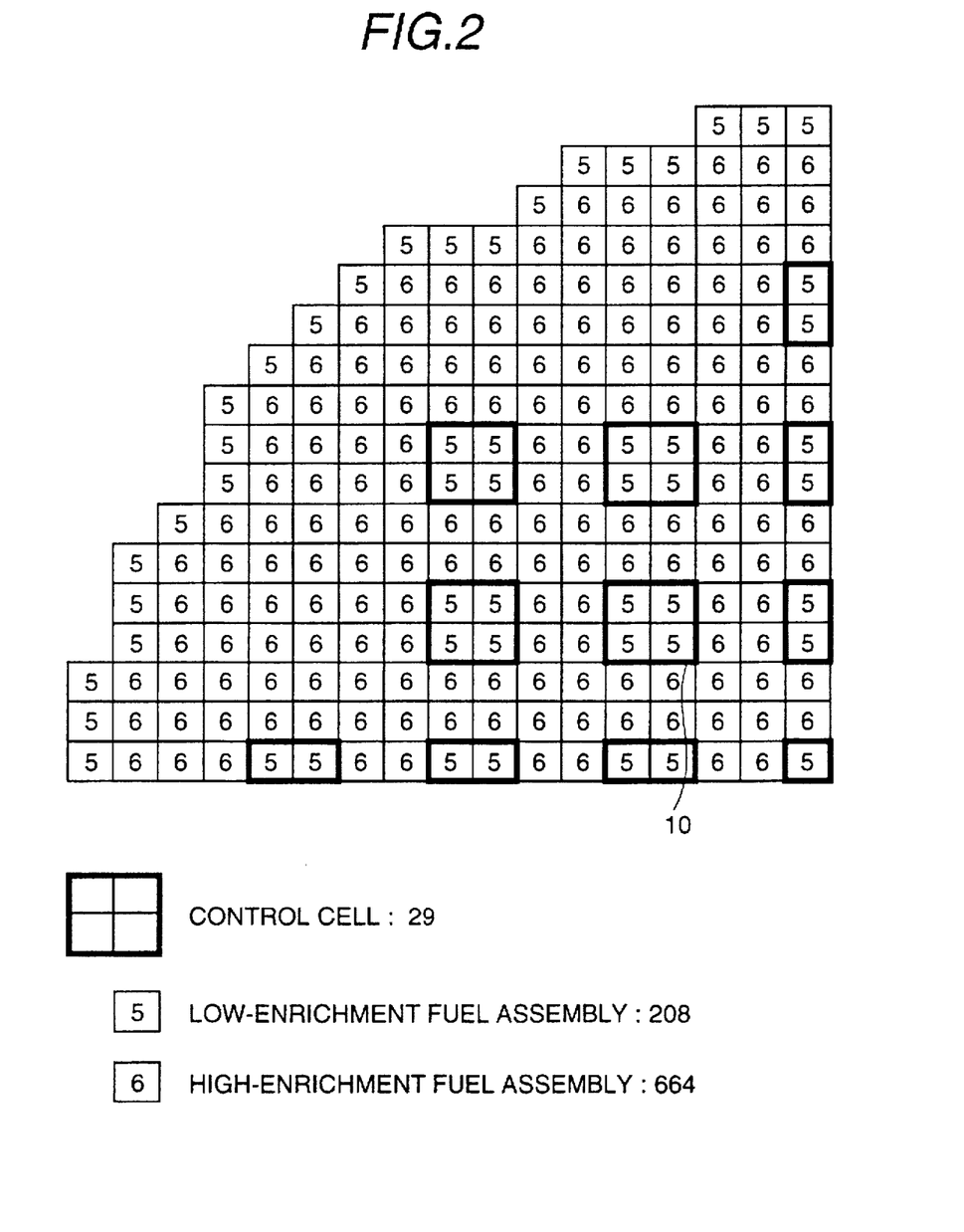
FIG. 2 is a ¼ cross sectional view of an initial loading core constituted by the method of FIG. 1.

In the first step of this method, new fuel assemblies are loaded into a nuclear reactor core to constitute an initial loading core. FIG. 2 shows the initial loading core constituted at the first step. FIG. 2 is an illustration showing a ¼ cross sectional view of this initial loading core. The initial loading core is constituted by assuming the condition that the electric output power is 1,350,000 KW and the operation cycle is 13 months. Moreover, it is assumed that the period of the startup test executed before staring the first-cycle operation is 2 GWd/t in terms of burnup.

The core of FIG. 2 comprises 664 high-enrichment fuel assemblies 6 with an average enrichment of 4.1 wt % and 208 low-enrichment fuel assemblies 5 with an average enrichment of 1.5 wt % and the total number of fuel assemblies is 872. The low-enrichment fuel 5 is loaded into the outermost layer and control cells 10 (29 cells enclosed by thick line frame) of the core and the high-enrichment fuel 6 is loaded into regions other than the above regions. The control cells 10 comprise four fuel assemblies enclosing a control rod inserted into the core while the nuclear reactor is operated. The core having the above structure has an average enrichment of approx. 3.5 wt %.

In this case, the outermost layer of the core is the position where at least one outer surface among four outer surfaces of the loaded fuel assemblies faces the external region of the core. Moreover, the position where at least one outer surface among four outer surfaces of the loaded fuel assemblies faces the outermost layer of the core is referred to as the second layer. Furthermore, the position where at least one outer surface among four outer surfaces of the loaded fuel assemblies faces the second layer is referred to as the third layer. Hereafter similarly, positions are referred to as the fourth layer, the fifth layer and so on.

This embodiment is constituted by assuming the average enrichment of the replacement fuel as 3.8 wt %. That is, the average enrichment of the high-enrichment fuel 6 is set to a value 0.3 wt % higher than the average enrichment of the replacement fuel.

After operating the first cycle with the core structure of FIG. 2, the first-time fuel movement is performed at the second step in FIG. 1. In the first-time fuel movement, the low-enrichment fuel 5 loaded in the outermost layer of the core is moved to the regions of the third to fifth layers to newly constitute 8 control cells 10. Instead, the high-enrichment fuel 6 loaded in the regions of the third to fifth layers is moved to the outermost layer.

Figure 3:
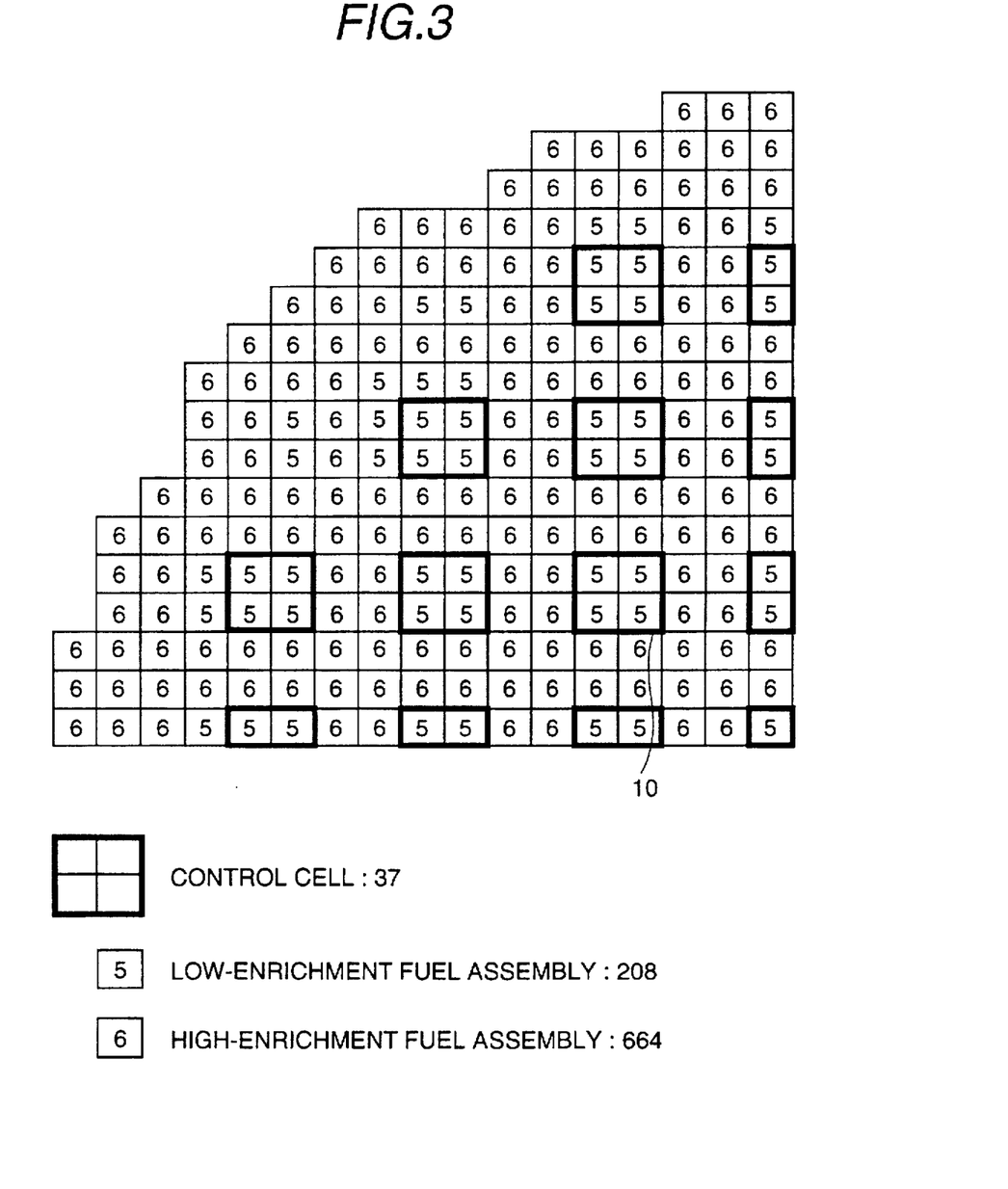
FIG. 3 is a ¼ cross sectional view of a second-cycle core constituted by the method of FIG. 1.

That is, fuel replacement is not performed at the first-time fuel movement but only the initially loaded fuel is moved (shuffled). As a result, the structure of the core at the second cycle is formed as shown in FIG. 3. The number of control cells 10 of this core is 37 which is 8 more than the number of control cells at the first cycle.

Then, after operating the second cycle with the core structure of FIG. 3, the second-time fuel movement is performed at the third step of FIG. 1. In the second-time fuel movement, 132 low-enrichment fuel assembly 5 are discharged from the core and instead, 132 first-time replacement fuel assembly 1 are loaded in the core.

More specifically, 60 low-enrichment fuel assemblies loaded in the regions of the third to fifth layers except the control cells 10 out of the total number of low-enrichment fuel assemblies 5 and 16 low-enrichment fuel assemblies loaded in the control cells 10 are moved to the outermost layer, and others are discharged from the core. Moreover, the total number, 148, of the high-enrichment fuel assemblies 6 are moved to the control cells 10 and the first-time replacement fuel 1 is loaded in the regions except the control cells 10 among the layers inside of the fourth layer.

Figure 4:
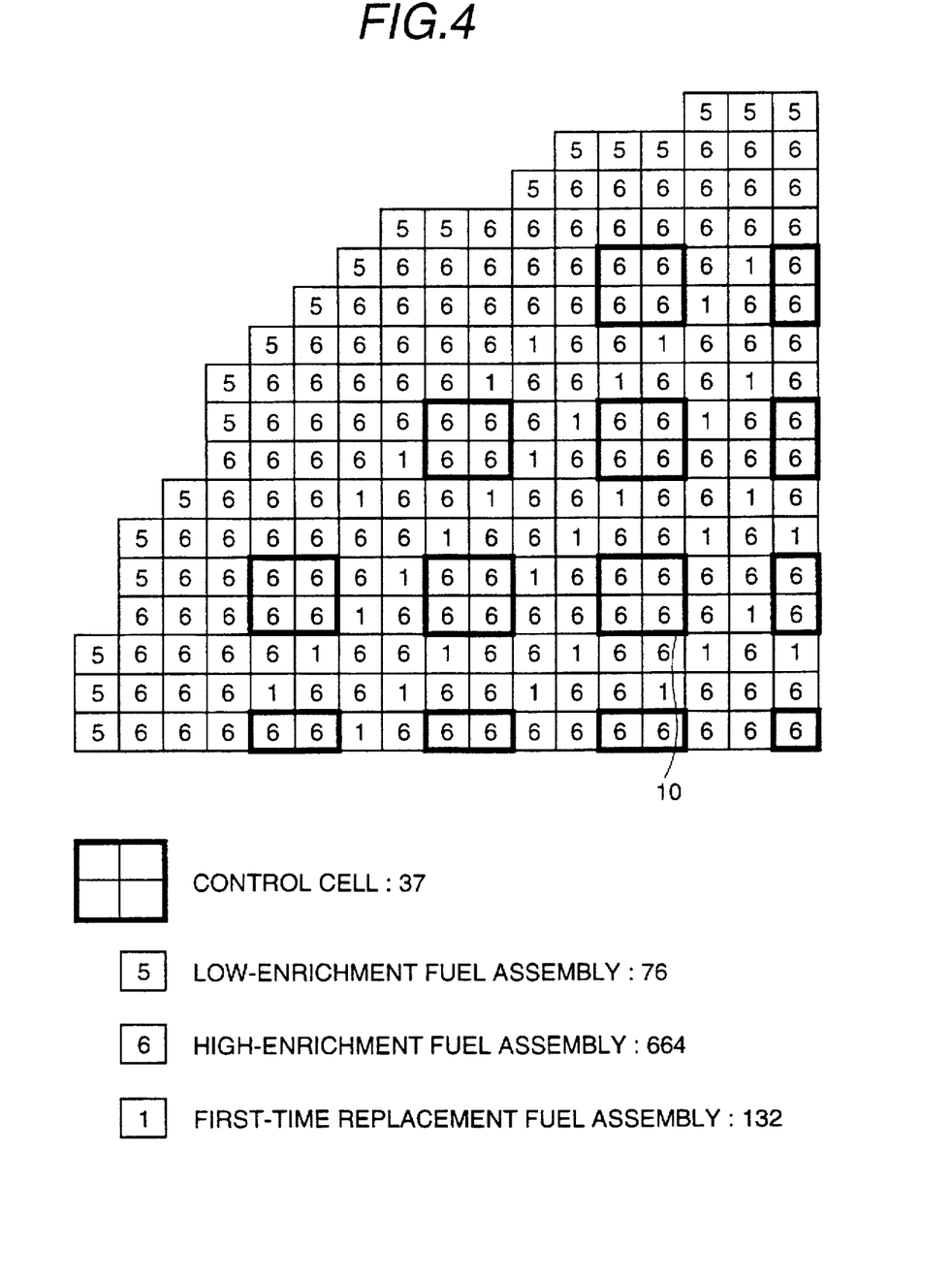
FIG. 4 is a ¼ cross sectional view of a third-cycle core constituted by the method of FIG. 1.

As a result, the structure of the core at the third cycle is formed as shown in FIG. 4. The core of FIG. 4 comprises 664 high-enrichment fuel assemblies 6, 76 low-enrichment fuel assemblies 5, and 132 first-time replacement fuel assemblies 1. Thirty-seven control cells 10 comprise the high-enrichment fuel 6 having been burned during the first and second cycles.

Then, after operating the third cycle with the core structure of FIG. 4, the third fuel movement is performed at the fourth step in FIG. 1. In the third-time fuel movement, 144 high-enrichment fuel assemblies 6 and 76 low-enrichment fuel assemblies 5 are discharged from the core and instead, 220 second-time replacement fuel assemblies 2 are loaded into the core. More specifically, the total number, 92, of high-enrichment fuel assemblies 6 are loaded into the outermost layer and the second-time replacement fuel assemblies 2 are loaded to regions except the control cells 10 among layers inside of the second layer.

Figure 5:
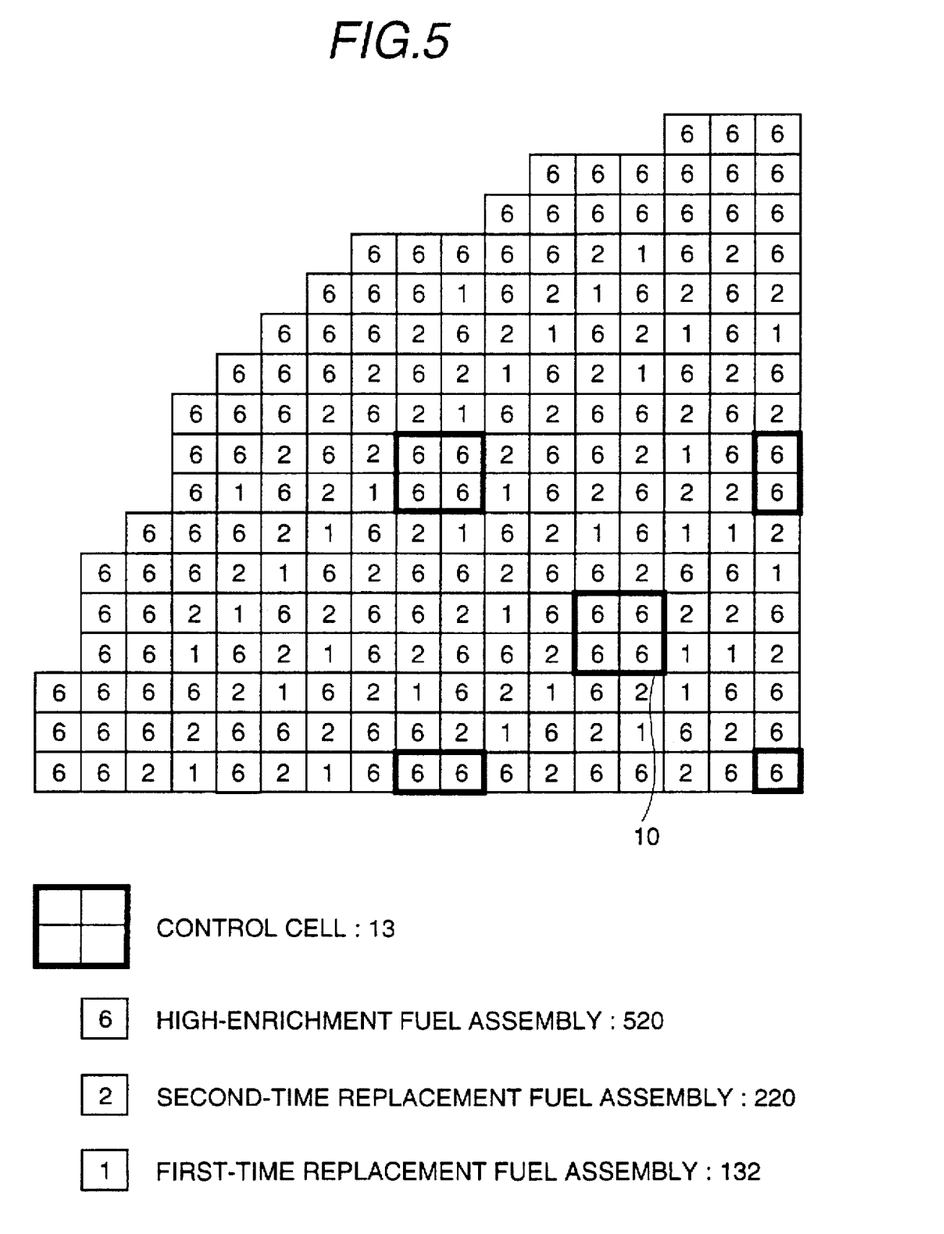
FIG. 5 is a ¼ cross sectional view of a fourth-cycle core constituted by the method of FIG. 1.

As a result, the core structure at the fourth cycle is formed as shown in FIG. 5. The core of FIG. 5 comprises 520 high-enrichment fuel assemblies 6, 132 first-time replacement fuel assemblies 1, and 220 second-time replacement fuel assemblies 2. Thirteen control cells 10 are constituted of the high-enrichment fuel 6 having been burned during the first and third cycles.

Then, after operating the fourth cycle with the core structure of FIG. 5, the fourth-time fuel movement is performed at the fifth step of FIG. 1. In the fourth-time fuel movement, 192 high-enrichment fuel assemblies 6 are discharged from the core and instead, 192 third-time replacement fuel assemblies 3 are loaded into the core. The third-time replacement fuel assemblies 3 is loaded into regions except the control cells 10 among the layers inside of the second layer.

Figure 6:
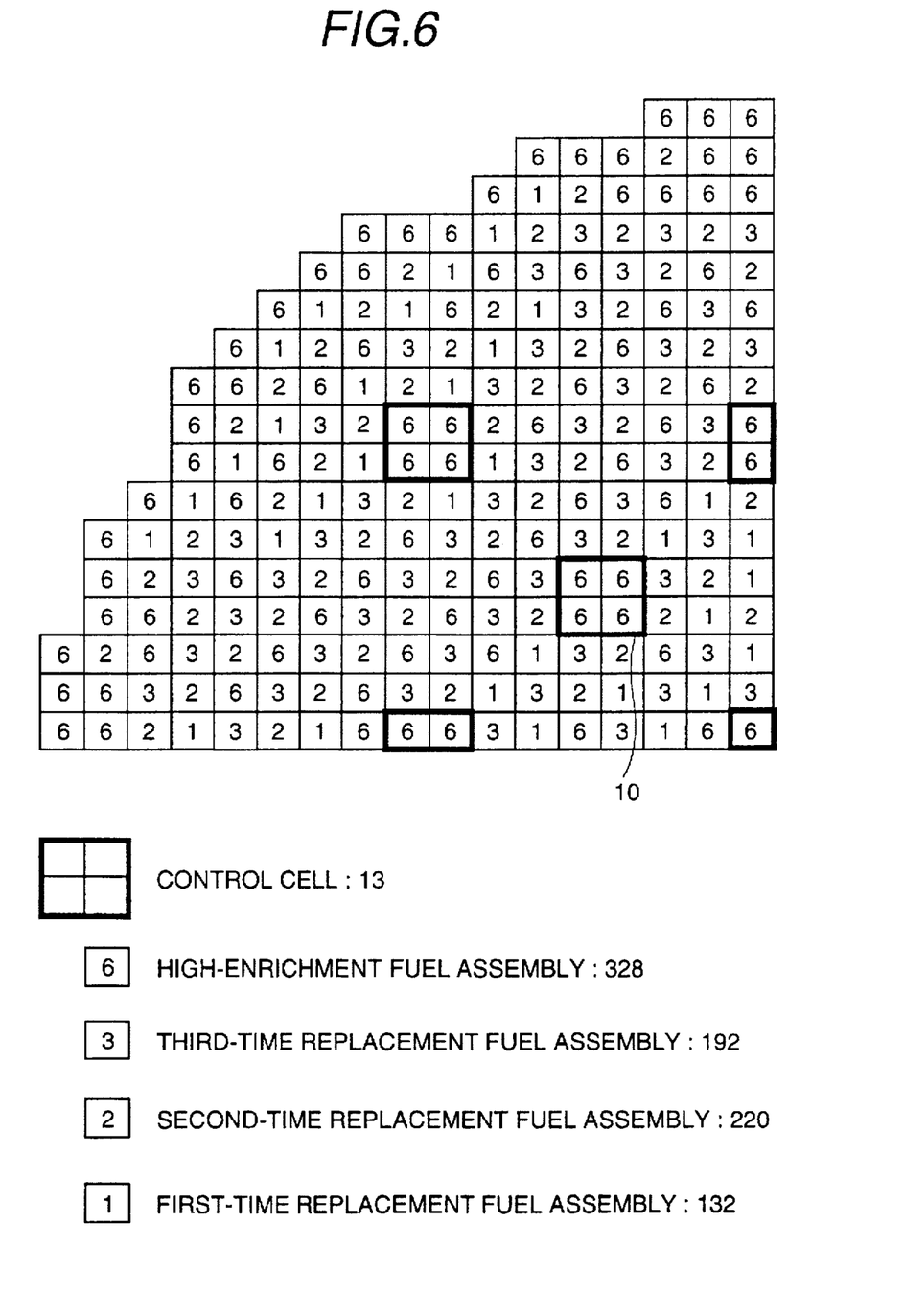
FIG. 6 is a ¼ cross sectional view of a fifth-cycle core constituted by the method of FIG. 1.

As a result, the core structure at the fifth cycle is formed as shown in FIG. 6. The core of FIG. 6 comprises 328 high-enrichment fuel assemblies 6, 132 first-time replacement fuel assemblies 1, 220 second-time replacement fuel assemblies 2, and 192 third-time replacement fuel assemblies 3. Thirteen control cells 10 are constituted of the high-enrichment fuel 6 having been burned during the first and fourth cycles.

Then, after operating the fifth cycle with the core structure of FIG. 6, the fifth-time fuel movement is performed at the sixth step of FIG. 1. In the fifth-time fuel movement, 328 high-enrichment fuel assemblies 6 are discharged from the core and instead, 184 fourth-time replacement fuel assemblies 4 and 144 high-enrichment fuel assemblies 7 discharged from the core at the third-time fuel movement (fourth step) are loaded into the core.

More specifically, the high-enrichment fuel 7 is mainly reloaded into regions inside of the second layer and the fourth-time replacement fuel 4 is loaded into regions inside of the outermost layer. Moreover, the first-time replacement fuel 1 loaded in the regions inside of the outermost layer is mainly moved to the outermost layer and the second layer and 52 fuel assemblies out of the second-time replacement fuel assemblies 2 are loaded into the control cells 10.

Figure 7:
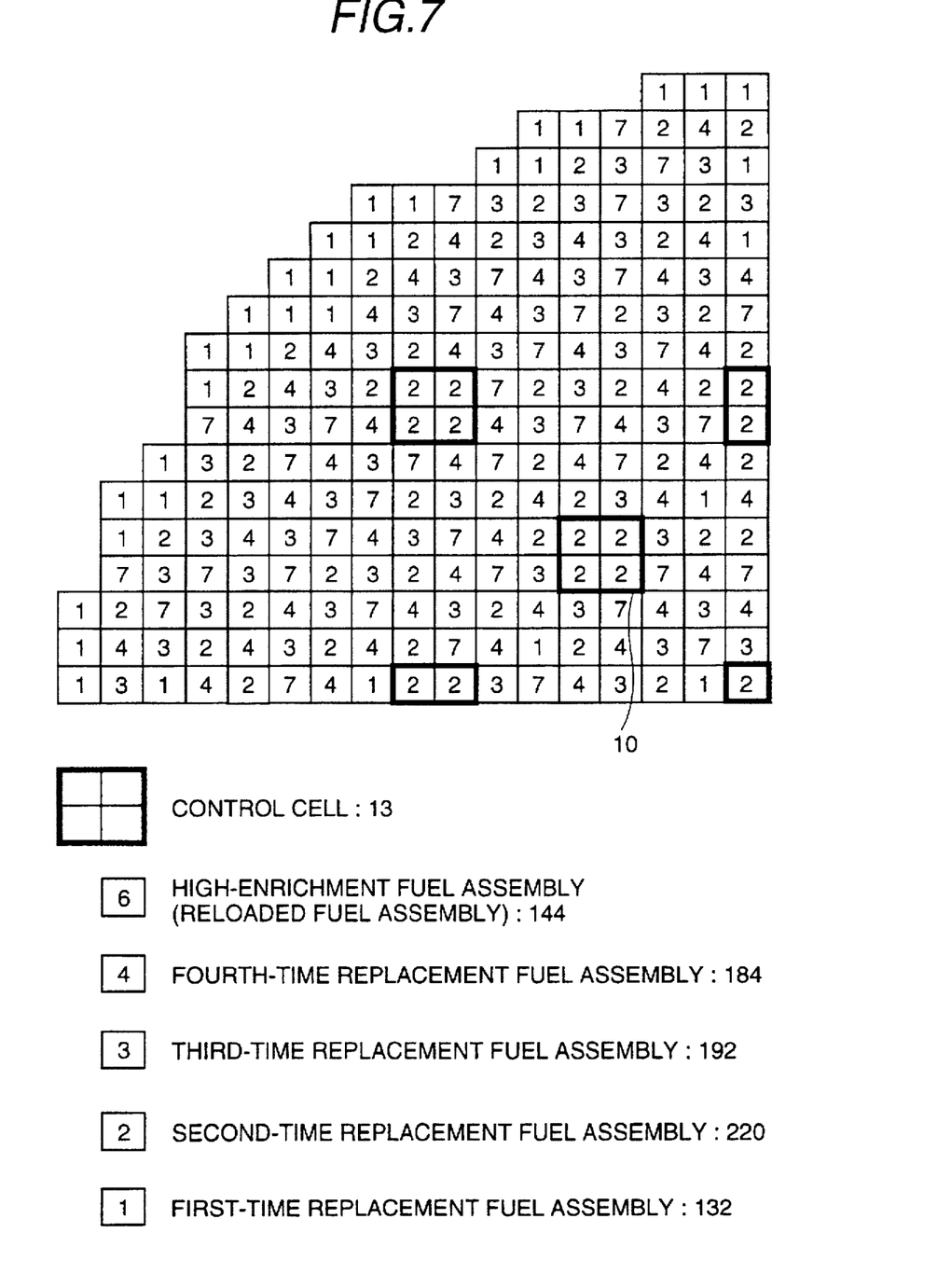
FIG. 7 is a ¼ cross sectional view of a sixth-cycle core constituted by the method of FIG. 1.

As a result, the core structure at the sixth cycle is formed as shown in FIG. 7. The core of FIG. 7 comprises 144 reloaded high-enrichment fuel assemblies 7, 132 first-time replacement fuel assemblies 1, 220 second-time replacement fuel assemblies 2, 192 third-time replacement fuel assemblies 3, and 184 fourth-time replacement fuel assemblies 4. That is, the initially loaded high-enrichment fuel 7 burned for three cycles and reloaded, the first-time replacement fuel 1 burned for three cycles, the second-time replacement fuel 2 burned for two cycles, the third-time replacement fuel 3 burned for one cycle, and the fourth-time replacement fuel 4 which is new fuel are loaded.

Seventy Six first-time replacement fuel assemblies 1, and 16 reloaded high-enrichment fuel assemblies 7 are loaded in the outermost layer of the core. The reloaded high-enrichment fuel 7, first-time replacement fuel 1, second-time exchange fuel 2, third-time replacement fuel 3, and fourth-time replacement fuel 4 are loaded into the regions inside of the outermost layer. Moreover, 13 control cells 10 are constituted of the second-time replacement fuel 2 having been burned during the fourth and fifth cycles.

When assuming a case in which the high-enrichment fuel discharged from the core at the end of the third cycle is not reloaded as a comparative example, 204 fourth-time replacement fuel assemblies and 124 initially loaded high-enrichment fuel assemblies loaded in the core at the sixth cycle.

This embodiment makes it possible to decrease the number of fuel assemblies to be replaced by 20 compared to the comparative example. Moreover, this embodiment makes it possible to increase the number of initially loaded high-enrichment fuel assemblies loaded in the core at the sixth cycle by 20 compared to the comparative example. Therefore, because this embodiment is able to burn more initially loaded fuel assemblies in the core for a long time, it is possible to increase the discharge exposure of the initially loaded fuel.

This advantage is mainly based on the following two features.

<1> The initially loaded high-enrichment fuel 7 discharged from the core at the end of the third cycle and containing a lot of fissionable material are reloaded and instead, the initially loaded high-enrichment fuel 6 burned for five cycles and thereby having less fissionable material are discharged from the core.

<2> Fuel assemblies with low reactivities are preferentially loaded into the outermost layer of the core to decrease the amount of neutrons leaking from the core.

The feature <2> is realized by reloading the fuel assemblies with low reactivities, out of the initially loaded high-enrichment fuel assemblies 7 burned for three cycles and thereby progressed in combustion compared to other fuel assemblies and the first-time replacement fuel assemblies 1, in the outermost layer.

The initially loaded fuel progresses in combustion compared to the replacement fuel because of the burning during the startup test even if the burning cycles of the both fuels are the same. The period of the startup test is approx. 2 GWd/t in terms of burnup and the enrichment corresponding to the value is approx. 0.2 wt %. Therefore, when the burning cycles are the same, the reactivity of the replacement fuel is lower than that of the initially loaded fuel if the enrichment of the initially loaded high-enrichment fuel is 0.2 wt % or more higher than that of the replacement fuel.

In the case of this embodiment, the initially loaded high-enrichment fuel 7 discharged from the core at the end of the third cycle and the first-time replacement fuel 1 loaded in the core during the third and fifth cycles have been burned for the same 3 cycles. Because the enrichment of the high-enrichment fuel 7 at the initial loading is 0.3 wt % higher than that of the first-time replacement fuel at it loading, the first-time replacement fuel 1 has lower reactivity at the end of the fifth cycle.

Therefore, as shown in FIG. 7, the first-time replacement fuel 1 is mainly loaded in the outermost layer of the core at the sixth cycle. However, by mainly loading the high-enrichment fuel 7 with a reactivity higher than that of the first-time replacement fuel 1 in the regions inside of the second layer, the discharge exposure of the initially loaded fuel is more effectively increased.

Thus, by arranging fuel assemblies with high reactivities in the central portion of the core and fuel assemblies with low reactivities in the periphery of the core, the number of neutrons leaking from the core is further decreased and the reactivity of the whole core can be further raised. Therefore, it is possible to further decrease the number of pieces of the replacement fuel.

Moreover, in the case of this embodiment, the rate of the high-enrichment fuel with an enrichment higher than that of the replacement fuel to the initially loaded fuel is approx. 76% (664 assemblies fuel/872 assemblies). The number of first-time replacement fuel assemblies is 132 and the number of second-time replacement fuel assemblies is 220. Therefore, when the number of low-enrichment fuel assemblies is less than 352 (132+220 assemblies), the high-enrichment fuel is discharged at the end of the third cycle. That is, when the number of high-enrichment fuel assemblies is more than 520 (872−352 assemblies), the high-enrichment fuel is discharged at the end of the third cycle. The above 520 fuel assemblies accounts for approx. 60% of 872 initially loaded fuel assemblies.

What is claimed is:

1. A fuel loading method for loading at least two types of fuel assemblies which are filled with nuclear fuel and have different average enrichments into a core, comprising the steps of:

discharging fuel assemblies with average enrichments higher than replacement fuel assemblies among the fuel assemblies initially loaded in the core after three operation cycles; and thereafter reloading the discharged fuel assemblies into the core after one operation cycle or more passes.

2. The fuel loading method according to claim 1, wherein the fuel assemblies discharged from the core are reloaded into the core after two more operation cycles pass.

3. The fuel loading method according to claim 1 wherein the average enrichment of the fuel assemblies discharged from the core is 0.2 wt % or more higher than the average enrichment of the replacement fuel assemblies.

4. The fuel loading method according to claim 1 wherein first-time replacement fuel is mainly loaded in the outermost layer of the core when the fuel assemblies discharged from the core are reloaded.

5. The fuel loading method according to claim 4, wherein the fuel assemblies discharged from the core are mainly reloaded in a region inside of the outermost layer of the core.

6. The fuel loading method according to claim 1 wherein the number of fuel assemblies with average enrichments higher than that of the replacement fuel assembly accounts for 60% of the total number of initially loaded fuel assemblies or more.

7. The fuel loading method according to claim 2, wherein the average enrichment of the fuel assemblies discharged from the core is 0.2 wt % or more higher than the average enrichment of the replacement fuel assemblies.

8. The fuel loading method according to claim 2, wherein first-time replacement fuel is mainly loaded in the outermost layer of the core when the fuel assemblies discharged from the core are reloaded.

9. The fuel loading method according to claim 3, wherein the number of fuel assemblies with average enrichments higher than that of the replacement fuel assembly accounts for 60% of the total number of initially loaded fuel assemblies or more.

* * * * *